US010949475B2

(12) United States Patent
Guy et al.

(10) Patent No.: US 10,949,475 B2
(45) Date of Patent: Mar. 16, 2021

(54) SEARCH SYSTEM FOR PROVIDING WEB CRAWLING QUERY PRIORITIZATION BASED ON CLASSIFICATION OPERATION PERFORMANCE (71) Applicant: eBay Inc., San Jose, CA (US)

(72) Inventors: Ido Guy, Haifa (IL); Idan Schwartz, Rishon le Zion (IL); Kira Radinsky, Zichron Yaakov (IL)

(73) Assignee: EBAY INC., San Jose, CA (US)

( * ) Notice: Subject to any disclaimer, the term of this patent is extended or adjusted under 35 U.S.C. 154(b) by 351 days.

(21) Appl. No.: 15/979,170

(22) Filed: May 14, 2018

(65) Prior Publication Data
US 2019/0347359 A1 Nov. 14, 2019

(51) Int. Cl.
G06F 16/951 (2019.01)
G06F 17/18 (2006.01)
(Continued)

(52) U.S. Cl.
CPC ........ *G06F 16/951* (2019.01); *G06F 16/9574* (2019.01); *G06F 17/18* (2013.01); *G06N 20/00* (2019.01)

(58) Field of Classification Search
CPC .................................................... G06F 16/951
See application file for complete search history.

(56) References Cited

U.S. PATENT DOCUMENTS 6,418,433 B1   7/2002   Chakrabarti et al.
7,672,943 B2 *  3/2010   Wong ............... G06F 16/9535
                                                707/709

(Continued)

FOREIGN PATENT DOCUMENTS

CN    107808325 A    3/2018
WO    2007/042840 A1  4/2007

OTHER PUBLICATIONS

Richardson et al., "Beyond PageRank: Machine Learning for Static Ranking", WWW_2006, May 23-26, 2006, 9 pages.

(Continued)

*Primary Examiner* — Hau H Hoang
(74) *Attorney, Agent, or Firm* — Shook, Hardy & Bacon L.L.P.

(57) ABSTRACT

Various methods and systems for processing web crawling queries using a web crawling prioritization model based on classification operation performance. A classification operation for organizing products in a product listing platform is accessed. A web crawling engine is accessed for the classification operation. The web crawling engine operates based on a web crawling query prioritization model that supports determining web crawling priority scores that indicate a predicted performance improvement for classification operations executed with known data and web crawled data to be retrieved from executing a web crawling query operation. Using the web crawling prioritization model, a web crawling priority score is determined for a web crawling query for the corresponding classification operation. The classification operation is associated with a product in a product listing platform and known data for the product. Based on the web crawling priority score, the web crawling query is executed to identify web crawled data.

20 Claims, 8 Drawing Sheets (51) Int. Cl.
  *G06N 20/00* (2019.01)
  *G06F 16/957* (2019.01)

(56) References Cited

U.S. PATENT DOCUMENTS

| | | |
|---|---|---|
| 8,285,703 B1 | 10/2012 | Wagers |
| 2005/0165778 A1 | 7/2005 | Obata et al. |
| 2006/0253582 A1 | 11/2006 | Dixon et al. |
| 2012/0072408 A1 | 3/2012 | Carmel et al. |
| 2016/0042427 A1 | 2/2016 | Thakur et al. |
| 2018/0053115 A1 | 2/2018 | Vachhani et al. |

OTHER PUBLICATIONS

Shah et al., "Understanding Focused Crawler", (IJCSIT) International Journal of Computer Science and Information Technologies, vol. 5(5), 2014, pp. 6849-6852.

Jordan et al., "Active Learning with Statistical Models", Department of Brain and Cognitive Sciences, Massachusetts Institute of Technology, 1995, 8 pages.

* cited by examiner

SEARCH SYSTEM FOR PROVIDING WEB CRAWLING QUERY PRIORITIZATION BASED ON CLASSIFICATION OPERATION PERFORMANCE

BACKGROUND

Users often rely on search systems to help find information stored on computer systems. Such search systems include web crawling functionality that is implemented to systematically browse the World Wide Web, typically for the purpose of web indexing to support search system operations. For example, a web crawler can be implemented in a search system so that a query for query result titles from the search system further includes additional relevant external information, where the additional relevant external information is identified by web crawler. With the ever-increasing use of search systems for retrieving electronically stored information, improvements in computing operations for search systems can provide more efficient processing of search queries and other operations in search systems.

SUMMARY

Embodiments of the present invention relate to methods, systems and computer storage media for providing a search system having web crawling prioritization functionality for performing classification operations. By way of background, search system web crawling can be computationally intensive and costly because of how conventional search systems execute web crawling queries using web crawlers. For example, for a classification task associated with a product in a product listing platform, a web crawler is commonly configured to indiscriminately crawl the World Wide Web to find relevant information for the product on the web. Even when there exist some cadence defined for web crawlers, it is still common to find search systems that simply implement a web crawler with limited additional functional configuration on how and when the web crawler is to operate. Moreover, without the additional functional configuration of web crawlers, certain features, attributes, or operations associated with the search system may not operate efficiently, especially in combination with the functionality provided by the web crawler. As such, an alternative approach for providing web crawling functionality in a search system would improve computing operations in search systems.

Embodiments of the present disclosure are directed towards improving search systems based on web crawling query prioritization. In particular, web crawling is provided based on a web crawling query prioritization model (i.e., a machine-learning model) that supports a web crawling framework, which prioritizes execution of web crawling queries based on a web crawling priority score. The web crawling priority score may refer to a predicted performance improvement for a classification operation that is executed with known data and web crawled data to be retrieved from executing a web crawling query operation over the classification operation executed with only the known data. For example, a web crawling framework may be defined, such that a web crawling priority score is calculated. And, based on the example framework, when the web crawling priority score is high (e.g., above a threshold), it is an indication that performing a selected classification operation with only the known data would not be improved by performing the selected classification operation with known data and web crawled data; and conversely, when the web crawling priority score is low (e.g., below a threshold), it is an indication that performing the selected classification operation with the known data only can be improved by performing the classification operation with the known data and web crawled data. In this regard, based on the web crawling priority score, the search system may logically determine when to and when not to execute a web crawling query for an associated classification operation. Accordingly, the performance improvement may be associated with improving specific classification operations for products in a product listing platform; moreover other applications of the web crawling priority score are contemplated with embodiments of the present disclosure, as described herein.

In operation, a classification operation for organizing products in a product listing platform is accessed. A web crawling engine is accessed. The web crawling engine operates based on a web crawling query prioritization model that supports determining web crawling priority scores that indicate a predicted performance improvement for classification operations executed with known data and web crawled data to be retrieved from executing a web crawling query operation. Using the web crawling prioritization model, a web crawling priority score is determined for a web crawling query for the corresponding classification operation. The classification operation is associated with a product in a product listing platform and known data for the product. Based on the web crawling priority score, the web crawling query is executed to identify web crawled data.

As such, the embodiments described herein improve computing operations for performing web crawling queries and classification operations in a search system, in that, the prioritization of web crawling queries via the web crawling query prioritization model results in computing efficiency in executing web crawling queries, classification operations, and other types of operations in search systems.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Search systems support identifying, for received queries, query result items (e.g., products or content) from item databases. Item databases can specifically be for content platforms or product listing platforms such as EBAY item listing platform, developed by EBAY INC., of San Jose, Calif. Search systems include web crawling functionality that is implemented to systematically browse the World Wide Web, typically for the purpose of web indexing to support search system operations. For example, a web crawler can be implemented in a search system so that a query for query result titles from the search system further includes additional relevant external information, where the additional relevant external information is identified by web crawler.

In conventional search systems, a web crawler can be implemented in a search engine for a product listing platform, so that a search query for a product can return search results including web crawler data relevant to the search query. For example, a search query "NIKE AIR JORDAN 3 Retro OG" can provide search results that include product listings for NIKE AIR JORDAN 3 Retro OG and also any crawled web pages that provide additional relevant information for the search query—"NIKE AIR JORDAN 3 Retro OG". In some product listing platforms, the additional relevant information can be used to define attributes, product pricing, and product descriptions for the products in a product listing platform.

Web crawler implementations can be time-consuming and expensive with reference to computing operations required to crawl millions of pages on the World Wide Web. For example, with each new type of product included in a product listing platform, a query may be executed to crawl the World Wide Web for relevant information from a variety of sources. However, blindly performing web crawling queries without any guidance can be especially inefficient in search systems having large corpus of indexed items. Even when there exist some cadence defined for web crawlers, it is still common to find search systems that simply implement a web crawler with limited additional functional configuration on how and when the web crawler is to operate. Moreover, without the additional functional configuration of web crawlers, certain features, attributes, or operations associated with the search system may not operate efficiently, especially in combination with the functionality provided by the web crawler. As such, a comprehensive search system with an alternative basis for executing web crawler queries can improve computing operations in search systems.

Embodiments of the present invention are directed to simple and efficient methods, systems and computer storage media for improving search systems using web crawler query prioritization. In particular, web crawling is provided based on a web crawling query prioritization model (i.e., a machine-learning model) that supports a web crawling framework, which prioritizes execution of web crawling queries based on a web crawling priority score. The web crawling priority score may refer to a predicted performance improvement for a classification operation that is executed with known data and web crawled data to be retrieved from executing a web crawling query operation over the classification operation executed with only the known data. For example, a web crawling framework may be defined, such that a web crawling priority score is calculated. Based on the web crawling priority score, the search system may logically determine when to and when not to execute a web crawling query for an associated classification operation. The web crawling score may not only be used to determine whether or not a web crawling query is executed or not executed, but may further be used to determine an extent or order of execution of the web crawling query, relative to other web crawling queries for other classification operations. As such, other applications of web crawling priority score are contemplated with embodiments of the present disclosure, as described herein.

In operation, a search system may implement several components to perform operations associated with providing web crawling query prioritization based on classification operation performance. The components may perform the specific operations based on, products, machine learning, training data, and classification operations that are supported by the search system. A search engine in the search system may access a classification operation for organizing products in a product listing platform. By way of background, the search engine can be part of a product listing platform that supports access to a product database. The products in the product database may be stored based on a data structure having a structural arrangement of products (e.g., a product category and a product classification system). For example, a product database may be implemented with a database schema that stores product listings based on product titles. The classification of the products may be maintained and annotated using classification operations that operate based on machine learning.

With reference to machine learning, by way of background, machine learning can support different types of predictive modeling, including regression modeling and classification modeling. Regression predictive modeling is the task of approximating a mapping function from input values to a continuous output variable. A continuous output variable is a real-value, such as an integer or floating point value. These are often quantities, such as amount and sizes. An algorithm that is capable of learning a regression predictive model is called a regression algorithm. Classification predictive modeling refers to the task of approximating a mapping function from input variables to discrete output variables. The output variables are often labels or categories. The mapping function predicts the class or category for a given observation. An algorithm that is capable of learning a classification predictive model is called a classification algorithm.

For classification operations that operate based on machine learning, classification algorithms may, for example, support identifying a selected category of a set of categories that a new observation belongs to, on the basis of a training set of data containing observations or instances whose category membership is known. In other words, the machine learning model supports making predictions of classification features or attributes for a new product based on known classification features or attributes of other products. Classification may be based on supervised learning where a training-set of correctly identified observations is available and a corresponding unsupervised procedure (e.g., clustering) for grouping products into categories is based on some measure of inherent similarity or distance. By way of example, given data samples and human labels based on direction observation (i.e., ground truth labels), a classification algorithm supports learning how to imitate the ground truth labels, without human supervision. So, for a deduplication classification operation, given a pair of products, a trained machine learning model may determine via a classification algorithm whether the products are a duplicate of each other or not. In particular, if 1 is a designated label for duplicate and 0 is a designated label for not duplicate in the machine learning model, the classification algorithm can produce a score between 0 and 1, for a pair of products. A threshold may be identified that is used to determine whether a product pair instance is a duplicate or not a duplicate. For example, a threshold may be 0.7 such that a product pair instance that is 0.8 is a duplicate while a product pair instance that is 0.6 is not a duplicate.

Different classification algorithms may be associated with classification operations for the search system. Classification operations may be associated with organizing products in a product listing platform for one of the following operations: product deduplication, product adoption, product attribute extraction, or product quality determination. By way of another example, a product listing platform may have an image-based classification operation. The image-based classification operation uses a combination of text and images in a machine learning model that uses a convolution neural network (CNN) to extract information from an image. The machine learning model also processes text (e.g., bag of words using a logistic regression). The machine learning model can be trained to support the image-based classification operation. As such, different types of classification algorithms and corresponding classification operations are contemplated with embodiments of the present invention.

The search engine may access a web crawling engine that operates based on web crawling query prioritization model. As discussed, a web crawling engine (i.e., web crawler) may be implemented as a mechanism that operates with classification operations for retrieving or crawling for external relevant data (e.g., web crawled data or web crawling data) from external sources. In particular, the web crawled data may be associated with the specific classification operations, in that, the web crawled data includes relevant product data that are used for executing the classification operation, for example, product deduplication as described herein.

With reference to the web crawling query prioritization model, the web crawling query prioritization model supports determining web crawling priority scores that indicate a predicted performance improvement for classification operations executed with known data and web crawled data to be retrieved from executing a web crawling query operation. At a high level, the web crawling prioritization model is a machine learning model. Conventional systems may simply train classification operations to make predictions for classification of products based on existing data (i.e., known data) for a product. For example, known data can include the information (e.g., attributes and features) that is stored for a product in a product database. Embodiments of the present disclosure, in contrast, employ a two-part training technique that includes training the web crawling query prioritization model on training data in a training mode in order to predict a web crawling priority score in a production mode, as discussed herein in detail.

At a high level, a training dataset is a dataset of examples used for learning, in order to fit the parameters (e.g., weights) of a classifier. The web crawled data can include actual web crawled data or web crawled data features (i.e., predicted web crawled data) that are used for training the web crawling query prioritization model and implementing the web crawling query prioritization model for making predictions. By way of example, the training data may include pairs of an input vector and the corresponding answer vector or scalar, which is commonly denoted as the target. The model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). Validation datasets can be used for regularization by early stopping: stop training when the error on the validation dataset increases, as this is a sign of overfitting to the training dataset. A test dataset may be used to provide an unbiased evaluation of a final model fit on the training dataset.

With embodiments of the present disclosure, two different techniques may be used to train a web crawling prioritization model that can predict a web crawling priority score. The first technique is a classification-regression technique and the second technique is a classification-classification technique. The classification-regression technique may operate with known data and web crawled data while the classification-classification technique may operate with known data and predicted web crawled data. In operation, the web crawling engine may have training operations and production operations corresponding to training time and production time. For the classification-regression technique, training operations may be performed offline using known data (e.g., a sample set of known data) and corresponding web crawled data. In particular, two classifiers may be implemented to generate a web crawling priority score such that a regressor is implemented using the instances of known data and corresponding web crawling priority scores to generate a model to predict web crawling priority scores. For the classification-classification technique, training operations may be performed offline using known data and corresponding predicted web crawled data. In particular, a classifier may be implemented to generate predicted web crawled data such that two classifiers are implemented using instances of known data and corresponding predicted web crawled data to generate a model to predict web crawling priority score. Using either method generates the web crawling query prioritization model production operations can be performed for large datasets. Production operations can be performed in a production environment with the classification operation, known data, and web crawling query prioritization model, where the web crawling query prioritization model was generated with using the classification-regression technique or the classification-classification technique, to predict the web crawling priority scores for corresponding classification operations.

By way of example, for the classification-regression technique, available training data can be denoted as $x\_1$ (i.e., known data) and $x\_2$ (i.e., web crawled data). For a given classification operation, two classification algorithms may be executed. The first classification algorithm is executed on $x\_1$ and the second classification algorithm is executed on the combination of $x\_1+x\_2$. The classification algorithms may be executed based on a first classifier and a second classifier, respectively. The first classifier produces a first score and the second classifier produces a second score. The scores may be prediction confidence scores for their corresponding classification algorithms. The first score is denoted as $s\_1$ and the second score is denoted as $s\_2$. In an exemplary web crawling prioritization framework, the web crawling query prioritization model operations include determining the difference between $s\_2$ and $s\_1$ as an absolute value (i.e., $s\_diff=|s\_2-s\_1|$). Upon determining $s\_diff$, a regressive predictive model may be trained to support predicting $s\_diff$ given known data (i.e., $x\_1$). The difference indicates an extent the web crawling data impacts the classification operation. In this regard, the web crawling query prioritization model is trained for determining web crawling priority scores (i.e., s_diff). In another embodiment, s_diff can be denoted as $s\_diff = |s\_2 - s\_1| + w\_1 * y$, where w_1 is a hyperparameter and y is a ground-truth label. The hyperparameter is a parameter from a prior distribution such that the alternative function supports prioritization based on a particular ground truth label.

By way of example, for the classification-classification technique, available training data can be denoted as x_1 (i.e., known data). For a given classification operation, a classification algorithm is executed to generate predicated web crawled data denoted as x_2. Further, as described in the classification-regression technique, for a given classification operation, two classification algorithms may be executed. The first classification algorithm is executed on x_1 and the second classification algorithm is executed on the combination of x_1+x_2 (i.e., predicted web crawled data). The classification algorithms may be executed based on a first classifier and a second classifier, respectively. The first classifier produces a first score and the second classifier produces a second score. The scores may be prediction confidence scores for their corresponding classification algorithms. The first score is denoted as s_1 and the second score is denoted as s_2. In an exemplary web crawling prioritization framework, the web crawling query prioritization model operations includes determining the difference between s_2 and s_1 as an absolute value (i.e., $s\_diff = |s\_2 - s\_1|$).

Accordingly, the web crawling prioritization model for predicting web crawling priority scores may be generated based on a classification-regression technique that uses known data and web crawled data, or a classification-classification technique that uses known data and predicted web crawled data. A predicted web crawling priority score indicates an extent of performance improvement for the selected classification operation executed with the known data and the web crawled data over the classification operation executed with only the known data. As discussed, the classification operation may be associated with organizing products in the product listing platform for one of the following: product deduplication, product adoption, product attribute extraction, or product quality determination. With reference to product deduplication as described herein, the web crawling priority score may indicate that the product deduplication classification operation for a product would have a predicted improvement when executed with the known data and the web crawled data over the product deduplication classification operation executed with only the known data.

It is contemplated that the first score, the second score, and the web crawling priority score can be utilized in a variations and combinations to support the functionality described herein. As discussed, the web crawling priority score is determined as a function of a known data score and a known data and web crawled data score for the classification operation. As such, the web crawling priority score can be configured such that the search engine may process the web crawling query based on a web crawling query processing operation corresponding to the web crawling priority score. For example, for a given web crawling priority score, the web crawling processing operation is configured to execute the web crawling query to identify web crawled data, such that the classification operation is executed with the known data and web crawled data identified from executing the web crawling query. In another example, for a given web crawling priority score, the web crawling processing operation is configured not to execute the web crawling query to identify web crawled data, such that the classification operation is executed with only the known data.

In yet another example, the web crawling priority scores or ranges of web crawling priority scores may be mapped to web crawling query processing operations. For example, based on the web crawling priority score, the web crawling query processing operation is selected from the following: executing the web crawling query, not executing the web crawling, or delaying execution of the web crawling query. The web crawling priority scores may be compared across different types of classification operations to prioritize classification operations, such that the search engine may execute a prioritized classification operation. Other variations and combinations of applying the web crawling priority scores for classification operation execution are contemplated with embodiments of the present invention.

Embodiments of the present invention have been described with reference to several inventive features associated with a search system having a web crawling prioritization model based on classification operation performance. Inventive features described include determining web crawling priority scores that indicate a predicted performance improvement for classification operations executed with known data and web crawled data to be retrieved from executing a web crawling query operation, amongst other features. Functionality of the embodiments of the present invention have further been described, by way of an implementation and anecdotal examples, to demonstrate that the operations for processing web crawling queries are an unconventional ordered combination of operations that operate with a web crawling query prioritization model as a solution to a specific problem in search technology environment to improve computing operations in search systems. Overall, these improvements result in less CPU computation, smaller memory requirements, and increased flexibility in search systems.

Figure 1A:
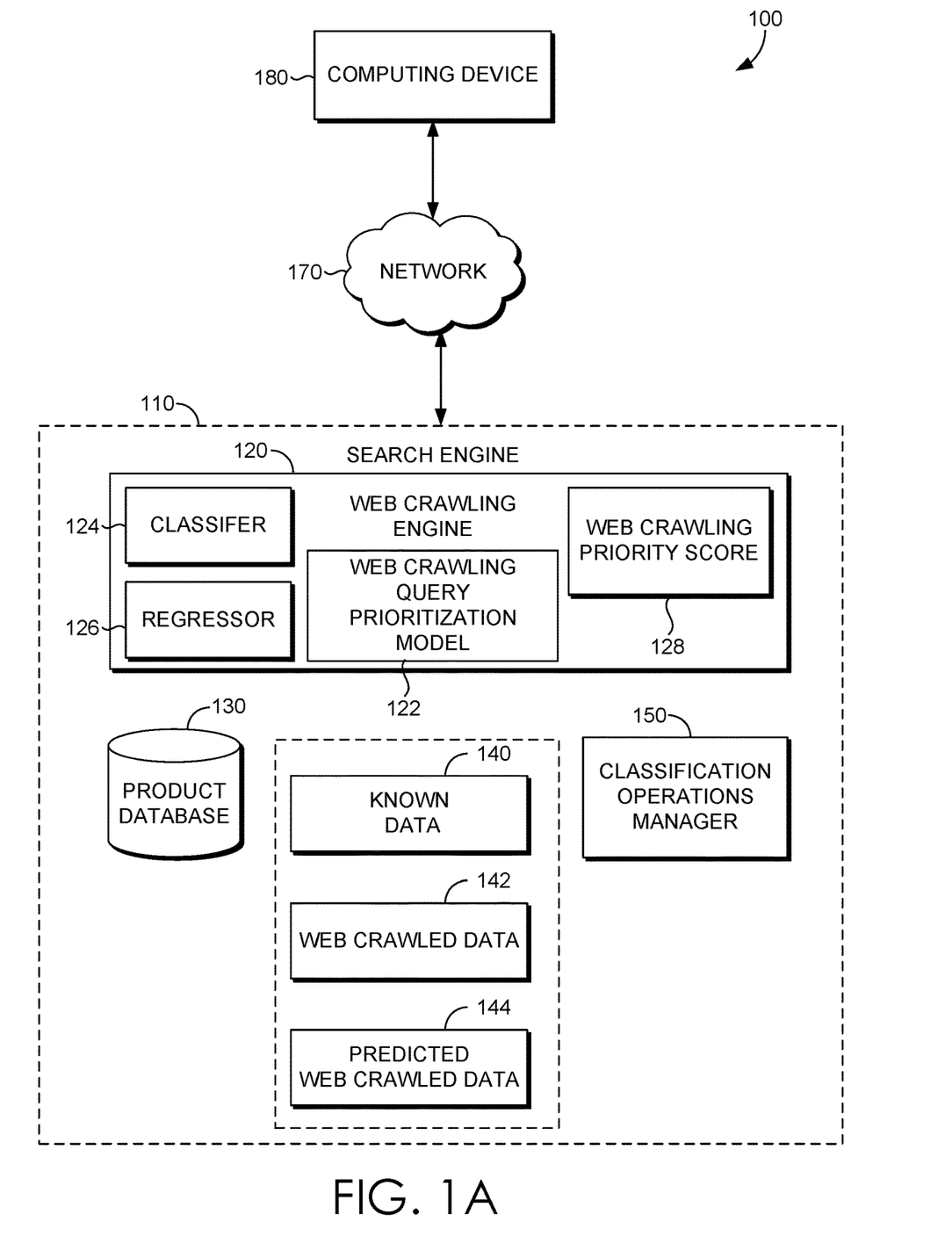
FIGS. 1A-1D are block diagrams of an exemplary search system with web crawling query prioritization, in which embodiments described herein may be employed.

With reference to FIG. 1A, FIG. 1A illustrates an exemplary search system 100 in which implementations of the present disclosure may be employed. In particular, FIG. 1A shows a high level architecture of search system 100 having components in accordance with implementations of the present disclosure. Among other components or engines not shown, search system 100 includes a computing device 180. The computing device 180 communicates via a network 170 and with a search engine 110. The search engine 110 includes web crawling engine 120 having web crawling query prioritization model 122, classifier 124, regressor 126, and web crawling priority score 128, product database 130, known data 140, web crawled data 142, and classification operations manager 150. Each of the identified components may represent a plurality of different instances of the component, for example, classifier 124 may represent classifier A, classifier B and classifier C, as described below. The components of the search system 100 may communicate with each other over one or more networks (e.g., public network or virtual private network "VPN") as shown with network 170. The network 170 may include, without limitation, one or more local area networks (LANs) and/or wide area networks (WANs). The computing device 180 may be a client computing device that corresponds to the computing device described herein with reference to FIG. 5.

The components of the search system 100 may operate together to provide functionality for processing web crawling queries based on a web crawling query prioritization model, as described herein. As discussed, the search system 100 supports processing operation requests (e.g., classification operations, search queries, other search system requests from the computing device 180. For example, a query for query result product titles from the search system may further include additional relevant external information, where the additional relevant external information is identified by the web crawling engine 120.

The search engine 110 is responsible for supporting the operations for providing web crawling query prioritization described herein. The search engine 110 in the search system 100 may access a classification operation for organizing products in a product listing platform. The search engine 110 may be part of a product listing platform that supports access to the product database 130. The products in the product database may be stored based on a data structure having a structural arrangement of products (e.g., a product category and a product classification system). For example, the product database 130 may be implemented with a database schema that stores product listings based on product titles. The classification of the products may be maintained and annotated using classification operations that operate based on machine learning.

The classification operations manager 150 manages the classifications operations that are supported via the search system 100. Classification operations may be associated with organizing products in a product listing platform for one of the following operations: product deduplication, product adoption, product attribute extraction, or product quality determination. For example, for a deduplication classification operation, given a pair of products, a trained machine learning model may determine via a classification algorithm whether the products are a duplicate of each other or not. By way of another example, a product listing platform may have an image-based classification operation. The image-based classification operation uses a combination of text and images in a machine learning model that uses a convolution neural network (CNN) to extract information from an image. As such, different types of classification algorithms and corresponding classification operations are contemplated with embodiments of the present invention.

The web crawling engine 120 supports training operations and production operations for implementing the web crawling prioritization model 122 in accordance with the search system 100. The web crawling query prioritization model 122 supports determining web crawling priority scores (e.g., web crawling score 128) that indicate a predicted performance improvement for classification operations executed with known data and web crawled data to be retrieved from executing a web crawling query operation. The web crawling prioritization model 122 is a machine learning model that is generated with based on a classification-regression technique or classification-classification technique as discussed with reference to FIGS. 1B and 1C, respectively, below.

Figure 1B:
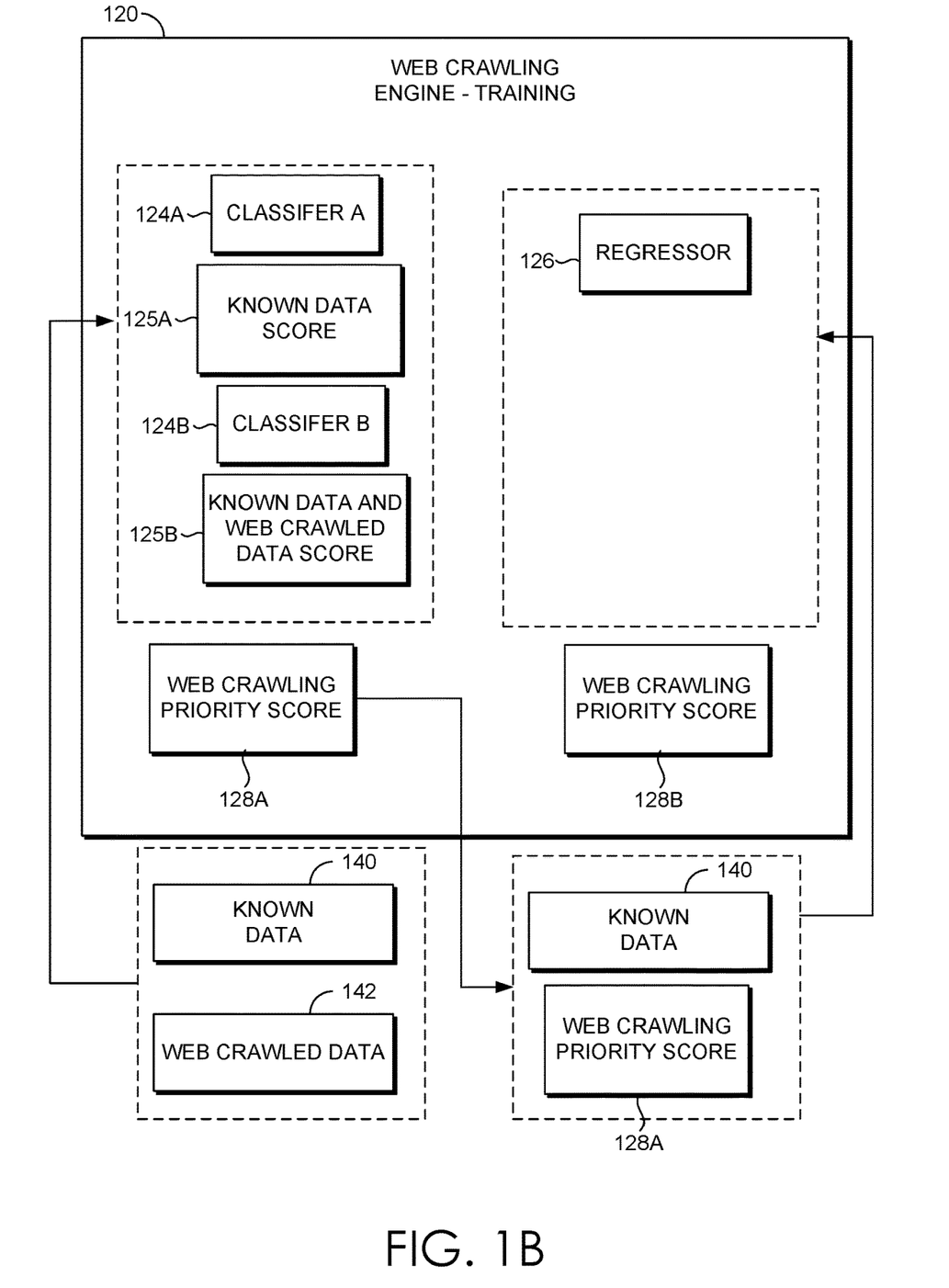

With reference to FIG. 1B, FIG. 1B illustrates web crawling engine 120 with components that support training operations for the classification-regression technique. For the classification-regression technique, training operations may be performed offline using known data 140 and corresponding web crawled data 142. In particular, two classifiers (i.e., classifier A 124A and classifier 124B) may be implemented to generate a web crawling priority score 128A. The web crawling priority score 128A is generated based on corresponding scores (i.e., known data score 125A and known data and web crawled data score 125B) for each of classifier A 124A and classifier B 124B, respectively. The known data score 125A is generated based on known data 140 and the known data and web crawled data score 125B is generated based on known data 140 and web crawled data 142. The regressor 126 is then implemented using the instances of known data 140 and corresponding web crawling priority scores (e.g., web crawling priority score 128A) to generate a model to predict web crawling priority scores (e.g., web crawling priority score 128B).

Figure 1C:
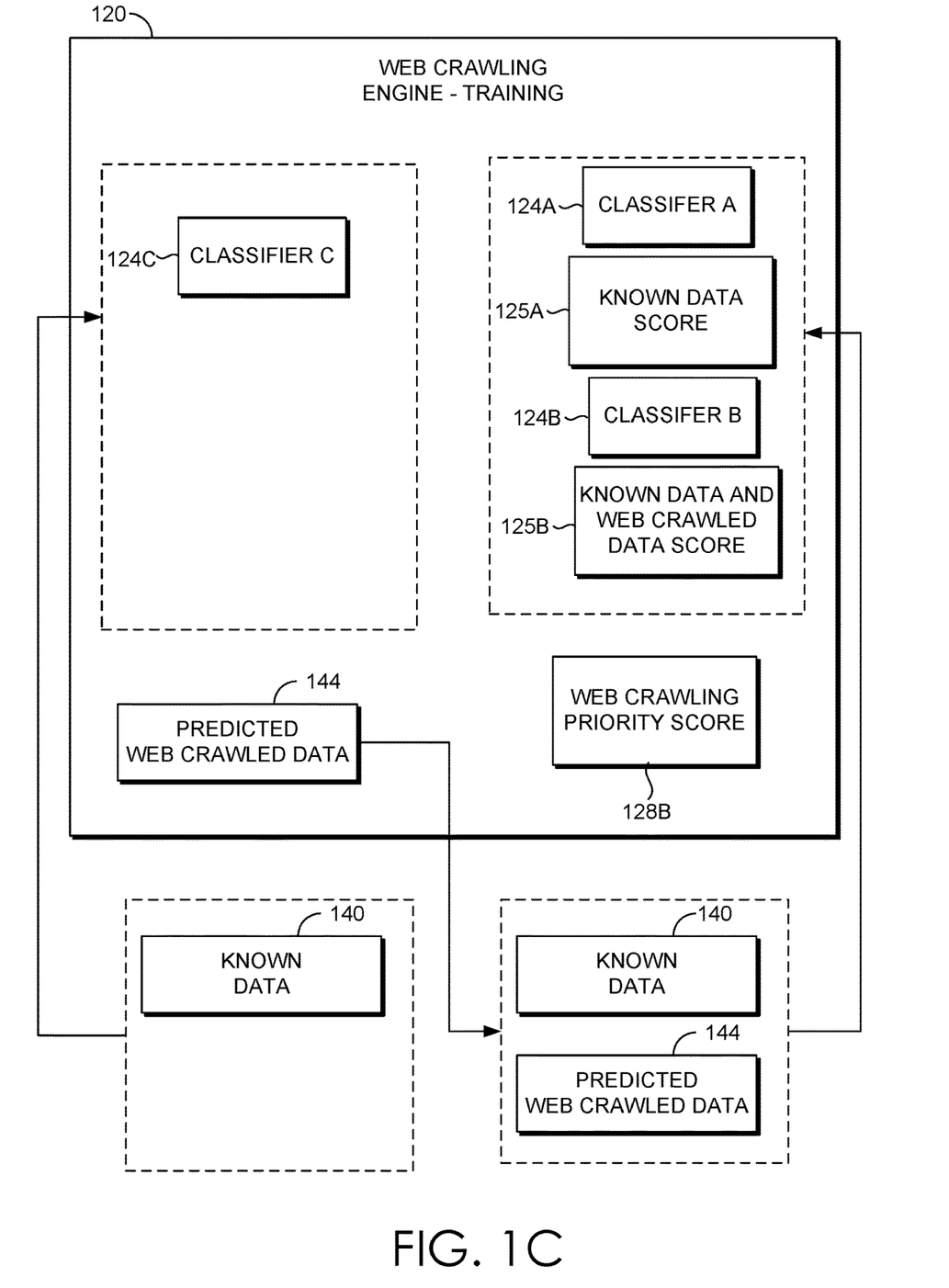

With reference to FIG. 1C, FIG. 1C illustrates web crawling engine 120 with components that support training operations for the classification-classification technique. For the classification-classification technique, training operations may be performed offline using known data 140 and corresponding predicted web crawled data 144. In particular, a classifier (i.e., classifier C 124C) may be implemented to generate predicted web crawled data 144 from known data 140. The predicted web crawled data 144 may be derived from known data 140. Two classifiers (i.e., classifier A 124A and classifier B 124B) are then implemented using instances of known data 140 and corresponding predicted web crawled data 144 to generate a model to predict web crawling priority scores (e.g., web crawling priority score 128B). The known data score 125A is generated based on known data 140 and the known data and web crawled data score 125B is generated based on known data 140 and predicted web crawled data 144.

Figure 1D:
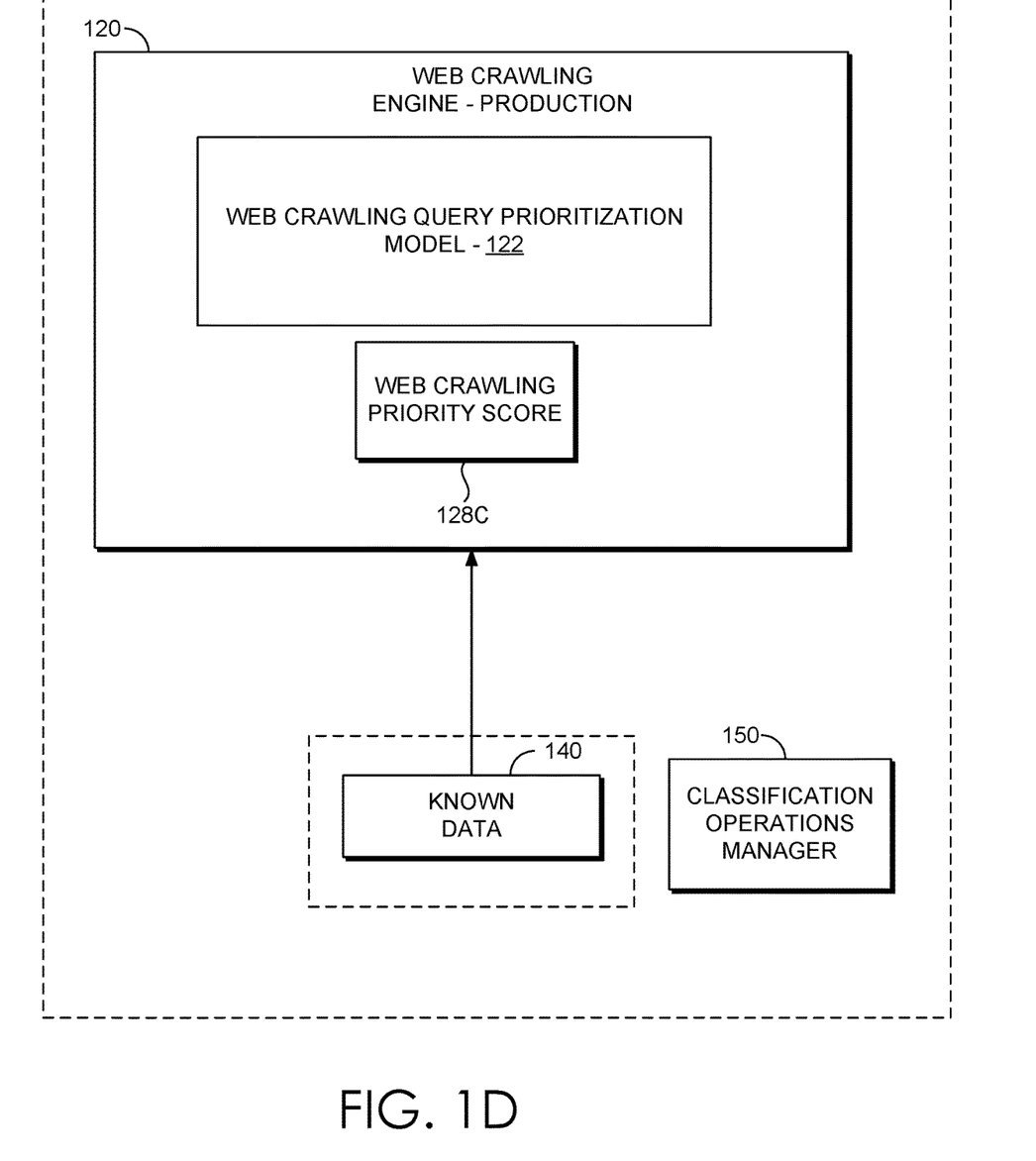

With reference to FIG. 1D, FIG. 1D illustrates web crawling engine 120 with components that support production operations with a web crawling query prioritization model 122 for predicting web crawling priority scores (e.g., web crawling priority score 128C) may be generated based on a classification-regression technique that uses known data and web crawled data, or a classification-classification technique that uses known data and predicted web crawled data, as discussed above. The predicted web crawling priority score 128C indicates an extent of performance improvement for the selected classification operation (e.g., via the classification operations manager 150) executed with the known data and web crawled data to be retrieved from executing a web crawling query operation over the classification operation executed with only the known data without executing the web crawling query. The classification operation may be associated with organizing products in the product listing platform for one of the following: product deduplication, product adoption, product attribute extraction, or product quality determination. With reference to product deduplication as described herein, the web crawling priority score may indicate that the product deduplication classification operation for a product would have a predicted improvement when executed with the known data and the web crawled data over the product deduplication classification operation executed with only the known data.

The search engine 110 may utilize the known data score 125A, known data and web crawled data score 125B, and the web crawling priority score 128 in variations and combinations to support the functionality described herein. As discussed, the web crawling priority score 128 is determined as a function of a known data score 125A and a known data and web crawled data score 125B for the classification operation. As such, the web crawling priority score 128 can be configured such that the search engine 110 may process the web crawling query based on a web crawling query processing operation corresponding to the web crawling priority score. For example, for a given web crawling priority score, the web crawling processing operation is configured to execute the web crawling query to identify web crawled data, such that the classification operation is executed with the known data 140 and web crawled data (not shown) from executing the web crawling query. In another example, for a given web crawling priority score, the web crawling processing operation is configured not to execute the web crawling query to identify web crawled data, such that the classification operation is executed with only the known data 140.

The search engine 110 may further configure the web crawling priority scores or ranges of web crawling priority scores such that they are mapped to web crawling query processing operations. For example, based on the web crawling priority score, the web crawling query processing operation is selected from the following: executing the web crawling query, not executing the web crawling, or delaying execution of the web crawling query. The web crawling priority scores may be compared across different types of classification operations to prioritize classification operation, such that the search engine may execute a prioritized classification operation. Other variations and combinations of applying the web crawling priority scores for classification operations execution are contemplated with embodiments of the present invention.

Figure 2:
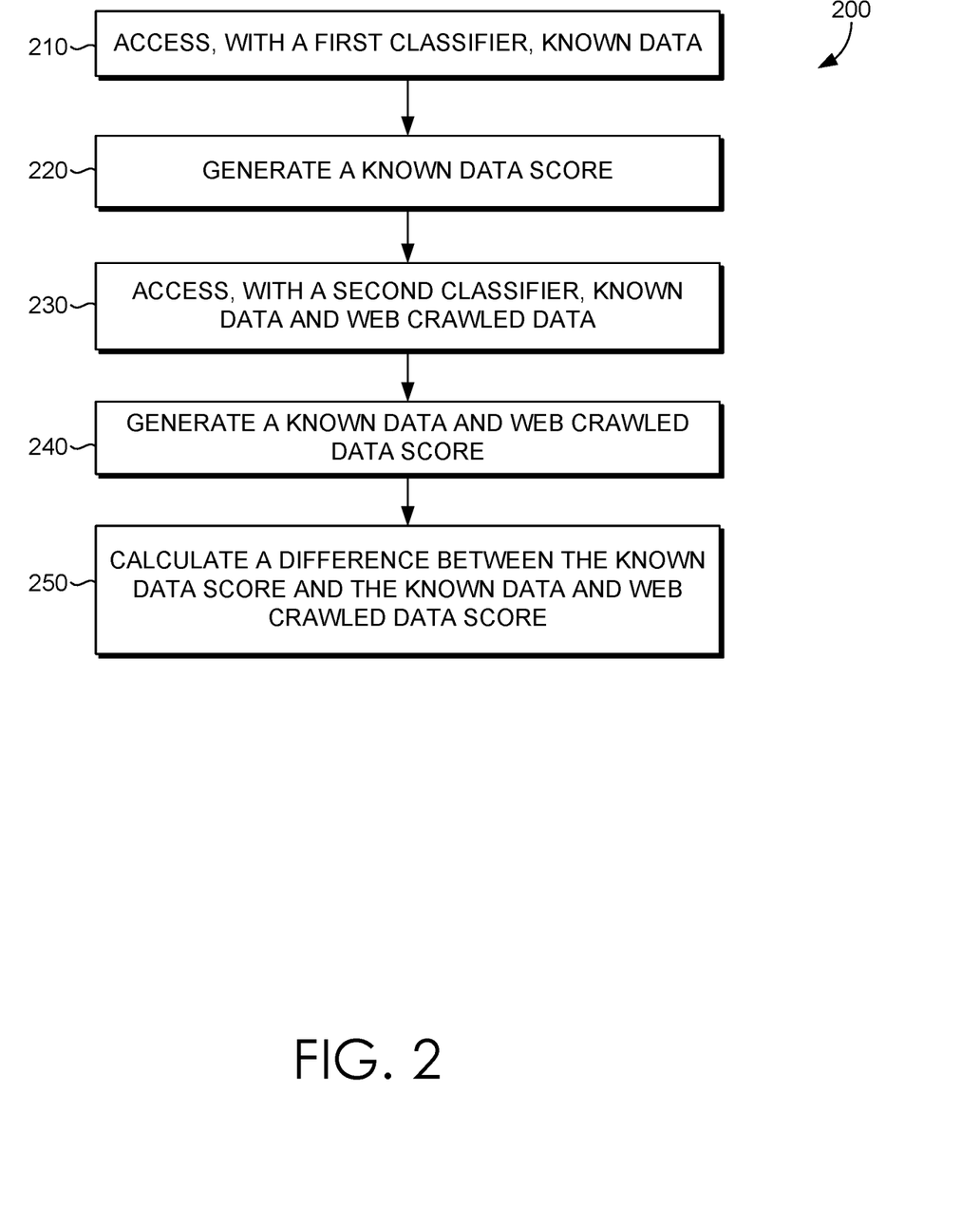
FIG. 2 is a flow diagram showing an exemplary method for implementing a search system with web crawling query prioritization, in accordance with embodiments described herein.
Figure 3:
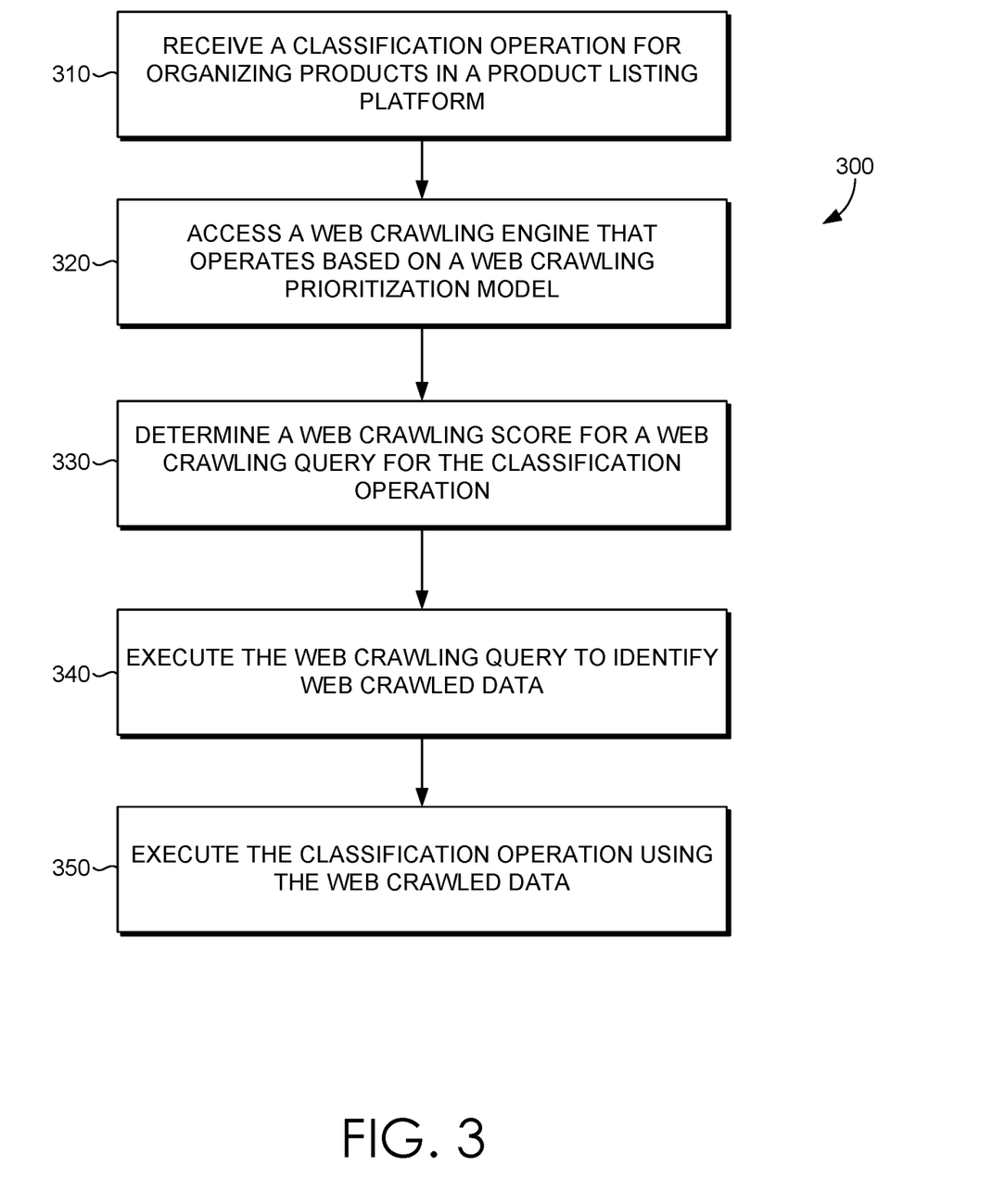
FIG. 3 is a flow diagram showing an exemplary method for implementing a search system with web crawling query prioritization, in accordance with embodiments described herein.
Figure 4:
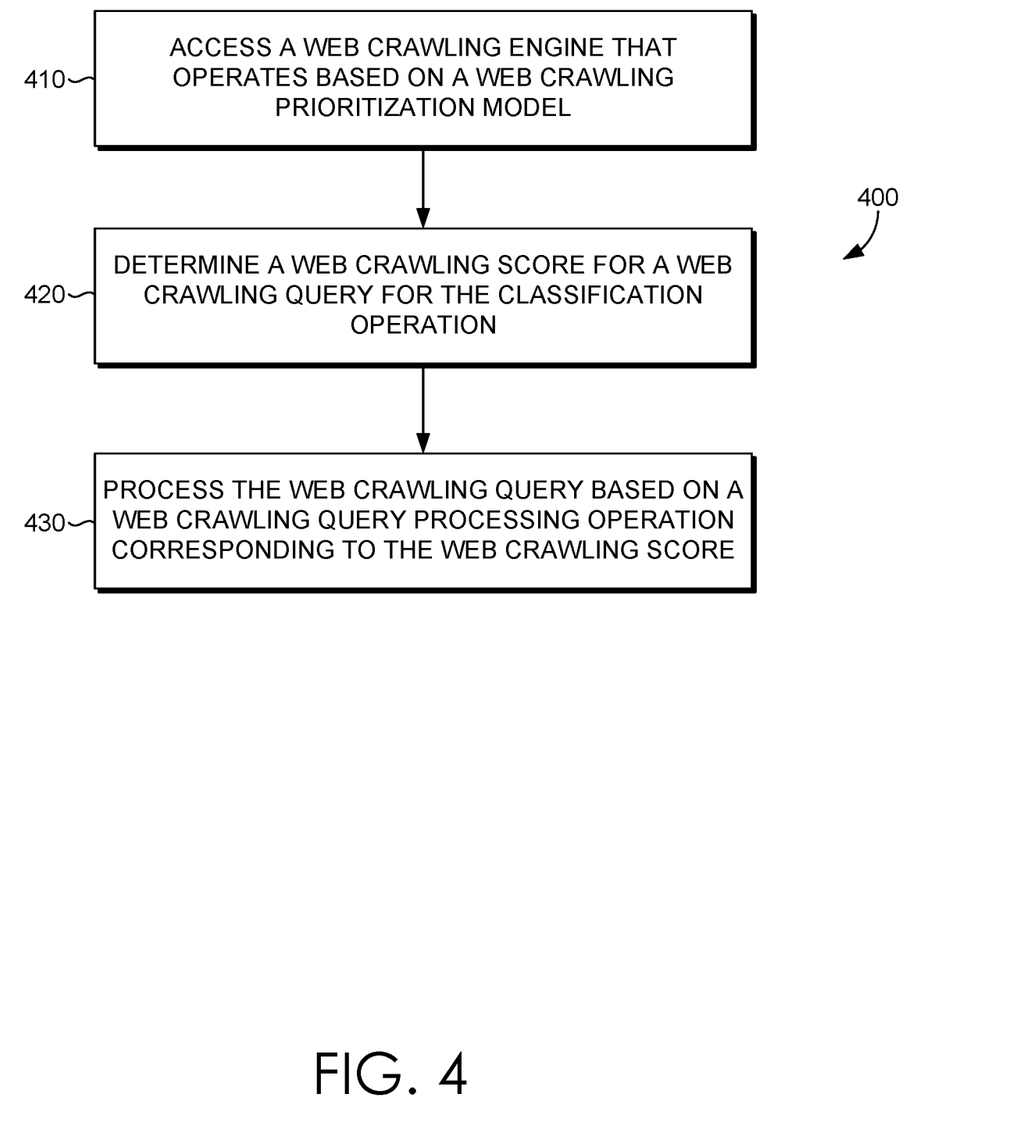
FIG. 4 is a flow diagram showing an exemplary method for implementing a search system with web crawling query prioritization, in accordance with embodiments described herein.

With reference to FIGS. 2, 3, and 4, flow diagrams are provided illustrating methods for implementing a search system for providing web crawling query prioritization. The methods may be performed using the search system described herein. In embodiments, one or more computer storage media having computer-executable instructions embodied thereon that, when executed, by one or more processors, can cause the one or more processors to perform the methods in the search system.

Turning to FIG. 2, a flow diagram is provided that illustrates a method 200 for implementing a search system for providing web crawling query prioritization for a selected classification operation. Initially at block 210, with a first classifier, known data is accessed. At block 220, a known data score is generated. At block 230, with a second classifier, known data and web crawled data (or predicted web crawled data) is accessed. At block 240, a known data and web crawled data score is generated. At block 250, a difference between the known data score and the known data and web crawled data score is calculated. The calculated difference is the web crawling priority score that indicates a predicted performance improvement for a classification operation executed with known data and web crawled data to be retrieved from executing a web crawling query operation.

Turning to FIG. 3, a flow diagram is provided that illustrates a method 300 for implementing a search system for providing web crawling query prioritization. Initially at block 310, a classification operation is received for organizing products in a product listing platform. At block 320, a web crawling engine that operates based on a web crawling prioritization model is accessed. At block 330, a web crawling score for a web crawling query for the classification operation is determined. At block 340, the web crawling query is executed to identify web crawled data. At block 350, the classification operation is executed using the web crawled data.

Turning to FIG. 4, a flow diagram is provided that illustrates a method 400 for implementing a search system for providing web crawling query prioritization. Initially at block 410, a web crawling engine that operates based on web crawling prioritization model is accessed. At block 420, a web crawling score is determined for a web crawling query for the classification operation. At block 430, the web crawling query is processed based on a web crawling query processing operation corresponding to the web crawling score. Based on the web crawling priority score, the web crawling query processing operation is selected from the following: executing the web crawling query, not executing the web crawling, or delaying execution of the web crawling query.

With reference to the search system 100, embodiments described herein support providing web crawling query prioritization for a search system. The search system components refer to integrated components that implement the image search system. The integrated components refer to the hardware architecture and software framework that support functionality using the search system components. The hardware architecture refers to physical components and interrelationships thereof and the software framework refers to software providing functionality that may be implemented with hardware operated on a device. The end-to-end software-based search system may operate within the other components to operate computer hardware to provide search system functionality. As such, the search system components may manage resources and provide services for the search system functionality. Any other variations and combinations thereof are contemplated with embodiments of the present invention.

By way of example, the search system may include an API library that includes specifications for routines, data structures, object classes, and variables may support the interaction the hardware architecture of the device and the software framework of the search system. These APIs include configuration specifications for the search system such that the components therein may communicate with each other for the novel functionality described herein.

With reference to FIG. 1A, FIG. 1A illustrates an exemplary search system 100 in which implementations of the present disclosure may be employed. In particular, FIG. 1A shows a high level architecture of search system 100 having components in accordance with implementations of the present disclosure. It should be understood that this and other arrangements described herein are set forth only as examples. In addition, a system, as used herein, refers to any device, process, or service or combination thereof. As used herein, engine is synonymous with system unless otherwise stated. A system may be implemented using components, managers, engines, or generators as hardware, software, firmware, a special-purpose device, or any combination thereof. A system may be integrated into a single device or it may be distributed over multiple devices. The various components, managers, engines, or generators of a system may be co-located or distributed. For example, although discussed for clarity as a singular component, operations discussed may be performed in a distributed manner. The system may be formed from other systems and components thereof. It should be understood that this and other arrangements described herein are set forth only as examples.

Having identified various component of the search system 100, it is noted that any number of components may be employed to achieve the desired functionality within the scope of the present disclosure. Although the various components of FIG. 1A are shown with lines for the sake of clarity, in reality, delineating various components is not so clear, and metaphorically, the lines may more accurately be grey or fuzzy. Further, although some components of FIG. 1A are depicted as single components, the depictions are exemplary in nature and in number and are not to be construed as limiting for all implementations of the present disclosure. The search system 100 functionality may be further described based on the functionality and features of the above-listed components.

Other arrangements and elements (e.g., machines, interfaces, functions, orders, and groupings of functions, etc.)

can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 5:
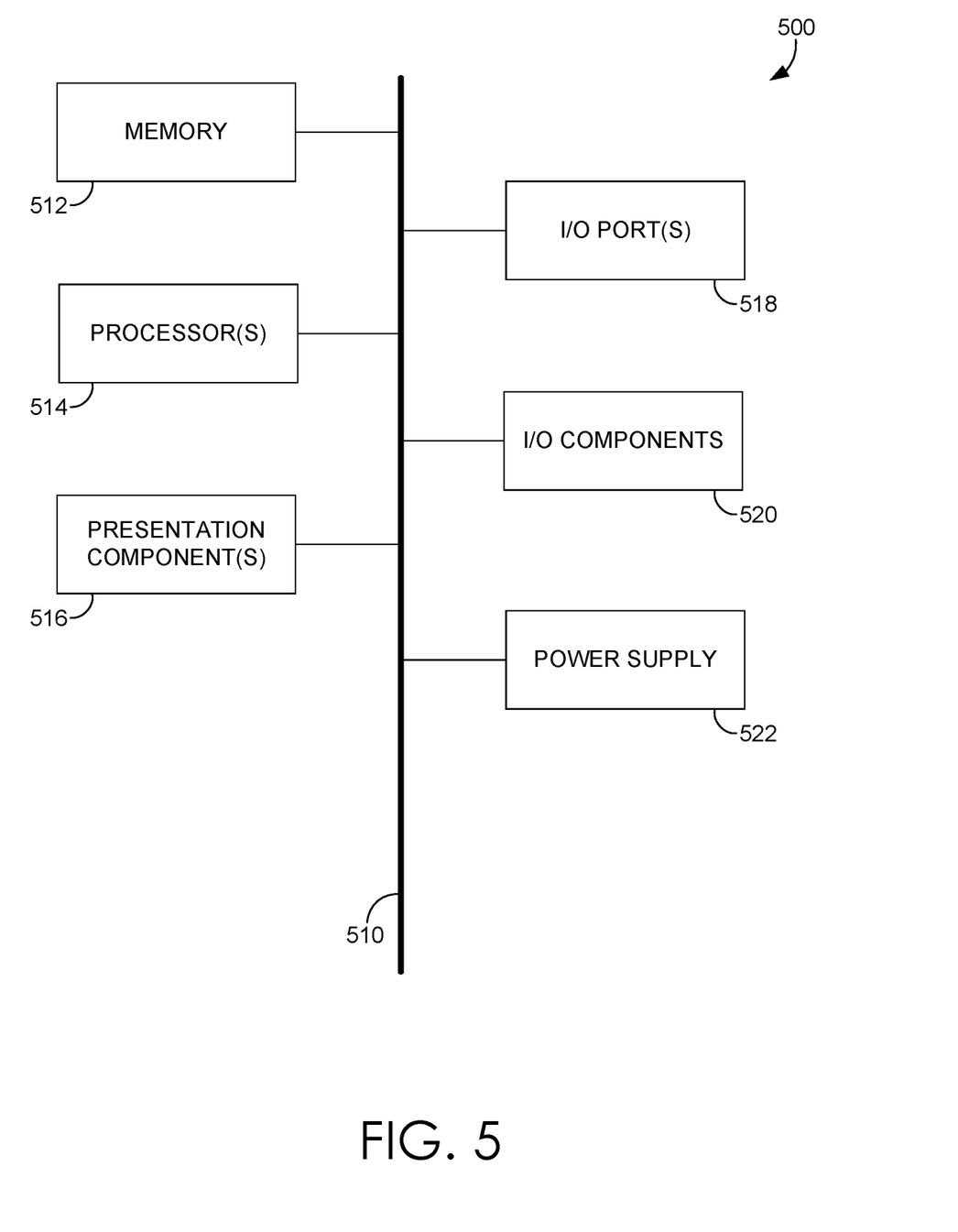
FIG. 5 is a block diagram of an exemplary computing environment suitable for use in implementing embodiments described herein.

Having described an overview of embodiments of the present invention, an exemplary operating environment in which embodiments of the present invention may be implemented is described below in order to provide a general context for various aspects of the present invention. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-usable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output ports 518, input/output components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the search system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A computer-implemented for processing web crawling queries, the method comprising:
   accessing a web crawling engine, the web crawling engine operates based on a web crawling query prioritization model that supports determining web crawling priority scores that indicate corresponding predicted performance improvements for classification operations executed with known data and web crawled data to be retrieved from executing a web crawling query operation;
   using the web crawling prioritization model, determining a web crawling priority score for a web crawling query for a corresponding classification operation associated with a performance improvement, wherein the predicted performance improvement for the classification operation is a predicted improvement of executing the classification operation with the known data and web crawled data to be retrieved by executing the web crawling query over the classification operation executed with only the known data, wherein the classification operation is associated with a product in a product listing platform and known data for the product; and
   based on the web crawling priority score, executing the web crawling query to identify web crawled data.

2. The method of claim 1, wherein, based on executing the web crawling query, the classification operation is executed with the known data and the web crawled data from executing the web crawling query.

3. The method of claim 1, wherein the web crawling priority score is determined as a function of a known data score and a known data and web crawled data score for the classification operation.

4. The method of claim 1, wherein the web crawling query prioritization model is a machine-learning model that is trained, for a selected classification operation, based on a classification-regression technique that implements a first classifier, a second classifier, and a regressor.

5. The method of claim 1, wherein the web crawling query prioritization model is a machine-learning model that is trained, for a selected classification operation, based on a classification-classification technique that implements a first classifier, a second classifier and a third classifier.

6. The method of claim 1, wherein web crawling priority score are further generated as a function of a hyperparameter and a ground-truth label.

7. The method of claim 1, wherein the classification operation is associated with organizing products in the product listing platform for one of the following: product deduplication, product adoption, product attribute extraction, or product quality determination.

8. One or more computer storage media having computer-executable instructions embodied thereon that, when executed, by one or more processors, cause the one or more processors to perform a method for processing web crawling queries, the method comprising:
   accessing a web crawling engine, the web crawling engine operates based on a web crawling query prioritization model that supports determining web crawling priority scores that indicate corresponding predicted performance improvements for classification operations executed with known data and web crawled data to be retrieved from executing a web crawling query operation;
   using the web crawling prioritization model, determining a web crawling priority score for a web crawling query for a corresponding classification operation associated with a performance improvement, wherein the predicted performance improvement for the classification operation is a predicted improvement of executing the classification operation with the known data and web crawled data to be retrieved by executing the web crawling query over the classification operation executed with only the known data, wherein the classification operation is associated with a product in a product listing platform and known data for the product; and
   based on the web crawling priority score, processing the web crawling query based on a web crawling query processing operation corresponding to the web crawling score.

9. The computer storage media of claim 8, wherein, for the web crawling priority score, the web crawling processing operation is configured to execute the web crawling query to identify web crawled data, such that the classification operation is executed with the known data and web crawled data from executing the web crawling query.

10. The computer storage media of claim 8, wherein, for the web crawling priority score, the web crawling processing operation is configured not to execute the web crawling query to identify web crawled data, such that the classification operation is executed with only the known data.

11. The computer storage media of claim 8, wherein the web crawling priority score is determined as a function of a known data score and a known data and web crawled data score for the classification operation.

12. The computer storage media of claim 8, wherein the web crawling query prioritization model is a machine-learning model that is trained, for a selected classification operation, based on a classification-regression technique that implements a first classifier, a second classifier, and a regressor.

13. The computer storage media of claim 8, wherein the web crawling query prioritization model is a machine-learning model that is trained, for a selected classification operation, based on a classification-classification technique that implements a first classifier, a second classifier and a third classifier.

14. The computer storage media of claim 8, wherein the classification operation is associated with organizing products in the product listing platform for one of the following: product deduplication, product adoption, product attribute extraction, or product quality determination.

15. A search system for processing web crawling queries, the system comprising:
one or more processors; and
one or more computer storage media storing computer-useable instructions that, when used by the one or more processors, cause the one or more processors to execute:
a web crawling engine:
access a web crawling query prioritization model that supports determining web crawling priority scores that indicate corresponding predicted performance improvements for classification operations executed with known data and web crawled data to be retrieved from executing a web crawling query operation;
determine a web crawling priority score for a web crawling query for a corresponding classification operation associated with a performance improvement, wherein the predicted performance improvement for the classification operation is a predicted improvement of executing the classification operation with the known data and web crawled data to be retrieved by executing the web crawling query over the classification operation executed with only the known data, wherein the classification operation is associated with a product in a product listing platform and known data for the product; and
based on the web crawling score, process the web crawling query based on a web crawling query processing operation corresponding to the web crawling priority score.

16. The system of claim 15, wherein, based on the web crawling priority score, the web crawling query processing operation is selected from the following:
executing the web crawling query, not executing the web crawling, or delaying execution of the web crawling query.

17. The system of claim 15, wherein, for the web crawling priority score, the web crawling processing operation is configured to execute the web crawling query to identify web crawled data, such that the classification operation is executed with the known data and web crawled data from executing the web crawling query; or
wherein, for the web crawling priority score, the web crawling processing operation is configured not to execute the web crawling query to identify web crawled data, such that the classification operation is executed with only the known data.

18. The system of claim 15, wherein the web crawling query prioritization model is a machine-learning model that is trained, for a selected classification operation, based on a classification-regression technique that implements a first classifier, a second classifier, and a regressor.

19. The system of claim 15, wherein the web crawling query prioritization model is a machine-learning model that is trained, for a selected classification operation, based on a classification-classification technique that implements a first classifier, a second classifier and a third classifier.

20. The system of claim 15, wherein the classification operation is associated with organizing products in the product listing platform for one of the following: product deduplication, product adoption, product attribute extraction, or product quality determination.

* * * * *